United States Patent [19]

Börjesgård et al.

[11] 4,281,510
[45] Aug. 4, 1981

[54] GAS TURBINE PLANT

[75] Inventors: Pehr Börjesgård; Renzo Cetrelli, both of Finspong; Anders Kullendorff, Åby; Stur Schön; Jan Wikner, both of Finspong, all of Sweden

[73] Assignee: Stal-Laval Turbin AB, Sweden

[21] Appl. No.: 74,462

[22] Filed: Sep. 11, 1979

[30] Foreign Application Priority Data

Sep. 12, 1978 [SE] Sweden ............................. 7809557

[51] Int. Cl.³ ........................... F02C 7/20; F02C 3/26
[52] U.S. Cl. ............................... 60/39.32; 60/39.46 S
[58] Field of Search .............. 60/39.32, 39.96 S, 726, 60/727

[56] References Cited

U.S. PATENT DOCUMENTS

| | | | |
|---|---|---|---|
| 2,418,800 | 4/1947 | Wilson | 60/39.32 |
| 2,439,473 | 4/1948 | Kalitinsky | 60/303 |
| 3,969,891 | 7/1976 | Aguet | 60/39.18 B |

*Primary Examiner*—Louis J. Casaregola
*Attorney, Agent, or Firm*—Pollock, Vande Sande & Priddy

[57] ABSTRACT

A gas turbine plant having a combustion chamber (1) separate from the turbine (15) includes a conduit (16) with an inner tube (17), which conducts heated propellant gas from the combustion chamber (1) to the turbine (15); and an outer tube (18), which surrounds the inner tube (17) to form an annular gap (20) which conducts compressed air from a compressor (10) to the combustion chamber (1). (FIG. 1.)

11 Claims, 8 Drawing Figures

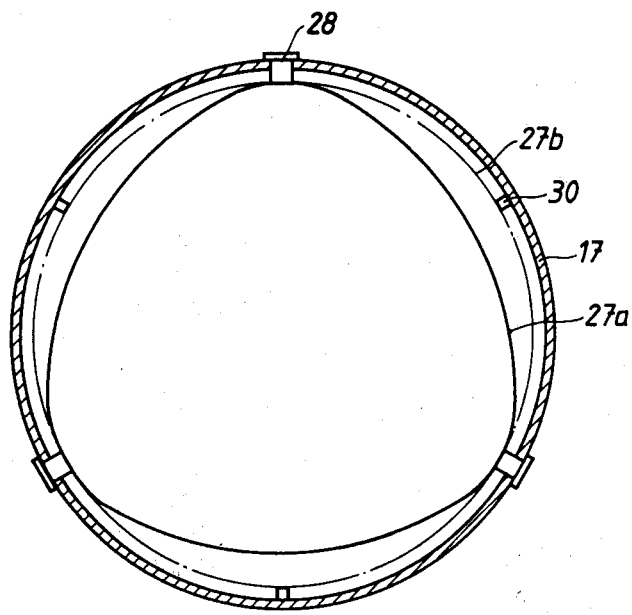
B - B         FIG. 5
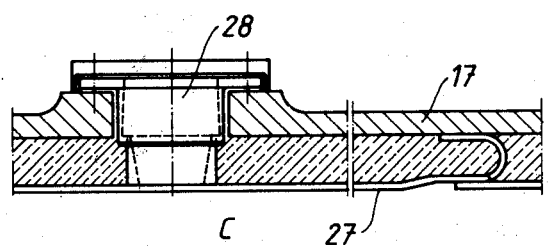
FIG. 6

GAS TURBINE PLANT

DESCRIPTION

1. Technical Field

The present invention relates to high power gas turbine plants having a capacity of 100 MW or more, of the type having a combustion chamber set at a considerable distance from the turbine for heating propellant gas to drive the turbine. This heating is effected by combustion of a fuel using compressed combustion air delivered by a compressor driven by the turbine. The invention is particularly suited for use in gas turbine plants fired by coal, which is burned in a fluidized bed. In plants of this kind, the fluidized bed and the cleaning equipment for the combustion gases typically are housed in a pressure container of considerable size which is suitably located in the open or in a separate building from the turbine. The gas conduits running from the turbine and compressor to the combustion chamber will therefore be relatively long.

2. Disclosure of Invention

An object of the invention is to provide a gas turbine plane in which heat losses are minimized during transfer of the hot propellant gas from the combustion chamber to the turbine.

A further object of the invention is to provide such a plant in which the conduit carrying combustion gases from the combustion chamber to the turbine is cooled with the compressor air so that the strength of the conduit is not reduced unacceptably due to the considerable heating thereof, while simultaneously recovering heat lost from the combustion gases by returning the lost heat with the compressor air to the combustion chamber.

Yet another object is to reduce the stresses produced in the gas conduit by the high pressure combustion gases, by balancing the inner overpressure with an outer overpressure.

Still another object of the invention is to reduce relative movement between the combustion gas conduit and its supports, the movement being caused by thermally induced expansion of the parts.

According to the invention a conduit having an inner tube is arranged between the combustion chamber and the turbine for transmitting hot propellant gas from the combustion chamber to the turbine. An outer coaxial tube surrounds the inner tube to form therebetween an annular gap for transmitting compressed air from a compressor in the plant to the combustion chamber.

Inside the inner tube there is arranged a casing tube of a heat-resistant material. The casing is assembled from several axially spaced parts and arranged to form an annular gap between itself and the inner tube. A layer of an insulating material may be applied in this gap. The parts of the casing tube are suitably joined to the inner tube of the conduit at at least three attachment points on the circumference. The parts of the casing tube are constructed and arranged in such a way that each part is able to move axially relative to its adjacent casing tube parts. This manner of attachment permits the casing tube to become elastically deformed radially between the fixing points in case of temperature changes.

The coaxial tube system is suitably axially fixed to the combustion chamber. Movements due to thermal expansion between a fixed point in the gas turbine and a fixed point in the combustion chamber are taken up by expansion devices at the connection to the turbine. The conduit may be constructed with a bend. It may be horizontal or inclining between the combustion chamber and the bend, and vertical between the bend and the connection to the gas turbine. Deformation-absorbing coupling devices, which permit a horizontal displacement of the tube bend relative to the gas turbine, are advantageously applied to the vertical part of the conduit between the tube bend and the turbine. The coupling devices may be metal bellows or sleeve joints, in which a sleeve on one tube part receives an end of an adjacent tube part. The sleeve, the tube end or both are constructed so that a certain angular deformation can be achieved. The sleeve, the tube end or both also may be constructed with spherical union surfaces. Sealing rings between the tube parts may be in the form of seals of piston ring type.

BRIEF DESCRIPTION OF DRAWINGS

The invention will be described in greater detail with reference to the accompanying drawings in which:

FIG. 5 shows an enlarged scale section view through the inner tube of the conduit taken along line B—B in FIG. 2;

FIG. 6 shows a longitudinal section through the inner tube, taken at location C in FIG. 2;

BEST MODE OF CARRYING OUT THE INVENTION

Figure 1:
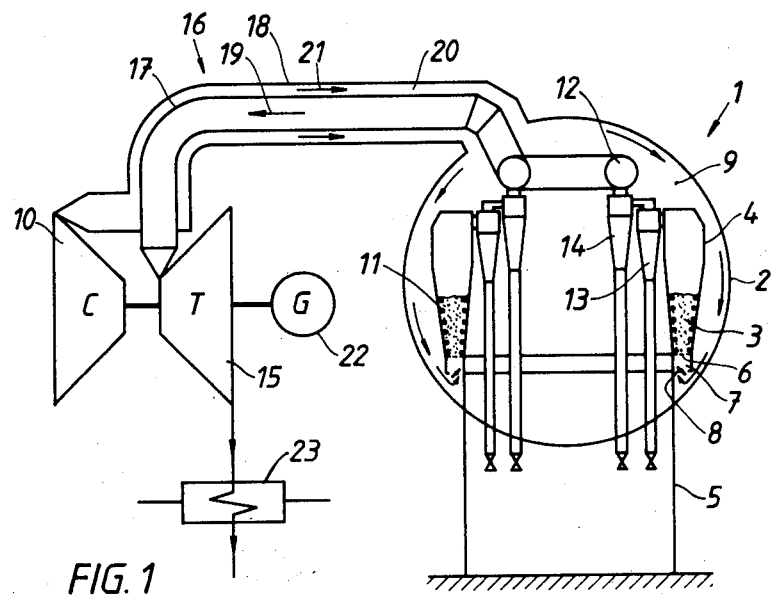
FIG. 1 shows a schematic view of a gas turbine plant.

In the Figures, a combustion chamber 1 comprises a spherical container 2 in which there is an annular fluidized bed 3 in a closed annular container 4. The spherical container 2 and the annular container 4 are supported by a stand 5. The annular container 4 is provided with a perforated bottom 6 and an annular air chamber 7. The bottom of the air chamber 7 has a number of valves 8 which regulate the flow of combustion air from the interior space 9 of the spherical container 2, which receives compressed air from the compressor 10 of the gas turbine plant. Container 4 is provided at its lower part with cooling tubes 11 for a steam generator for a steam turbine plant (not shown) working in parallel with the gas turbine plant. Series-connected dust separators 13 and 14 receive hot combustion gases from fluidized bed 3 and discharge it to an annular discharge header or collecting tube 12.

A gas turbine 15 and a compressor 10 driven by the gas turbine 15 are interconnected with the combustion chamber 1 via a conduit 16 which comprises two coaxial tubes 17 and 18. Inner tube 17 is connected to annular discharge header 12 and conducts heated gas from the combustion chamber 1 to the gas turbine 15, as shown by the arrow 19. An outer, coaxial tube 18 is connected to container 2 and to compressor 10 and conducts compressed air from compressor 10 to space 9 between the wall of container 2 and the equipment enclosed therein, as shown by the arrow 21. Turbine 15 also drives a generator 22. The exhaust gases from turbine 15 are led to a heat exchanger 23, where the residual heat of the gas is utilized, such as for preheating of feed water. From the foregoing, it will be understood that the spherical container 2 is under pressure. In a gas turbine plant of this kind, the internal overpressure may be 15–20 bar. The temperature of the propellant gas of the turbine 15 may be 800°–900° C.

Due to the unique arrangement of tubes 17 and 18, the pressure of the compressed air in annular space 20 essentially will correspond to the pressure of the hot gas inside tube 17. Thus tube 17, which conveys the hot gas, is subjected to slight stresses due to the small pressure drop across its wall. At the same time, the compressed air in gap 20 cools tube 17 so that the tube is held at a sufficiently low temperature to minimize loss of strength due to thermal effects. The compressed air, i.e. the combustion air, is preheated when cooling the inner tube 17 so that heat lost by the hot gas is returned with the compressed air to the combustion chamber and can thus be utilized. The temperature of the gas leaving the fluidized bed preferably is regulated such that a desired temperature is obtained at the inlet of the turbine 15. By maintaining tube 17 at a temperature of about 200° C., it retains such strength as will enable it to withstand, without difficulty, the small external overpressure which arises because of pressure drops in conduit 16 and in fluidized bed 3. Such temperature regulation may be achieved, completely or partly, by cooling the walls of the annular container 4 with cooling tubes 11, through which water or steam is passed. Temperature regulation may also be accomplished by regulating the volume of excess air supplied during combustion in fluidized bed 3.

Figure 3:
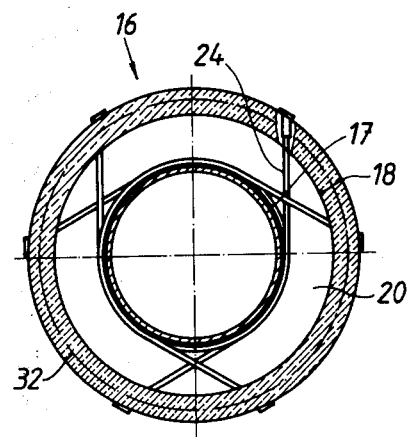
FIG. 3 shows a radial section through the conduit taken along line A—A in FIG. 2.
Figure 2:
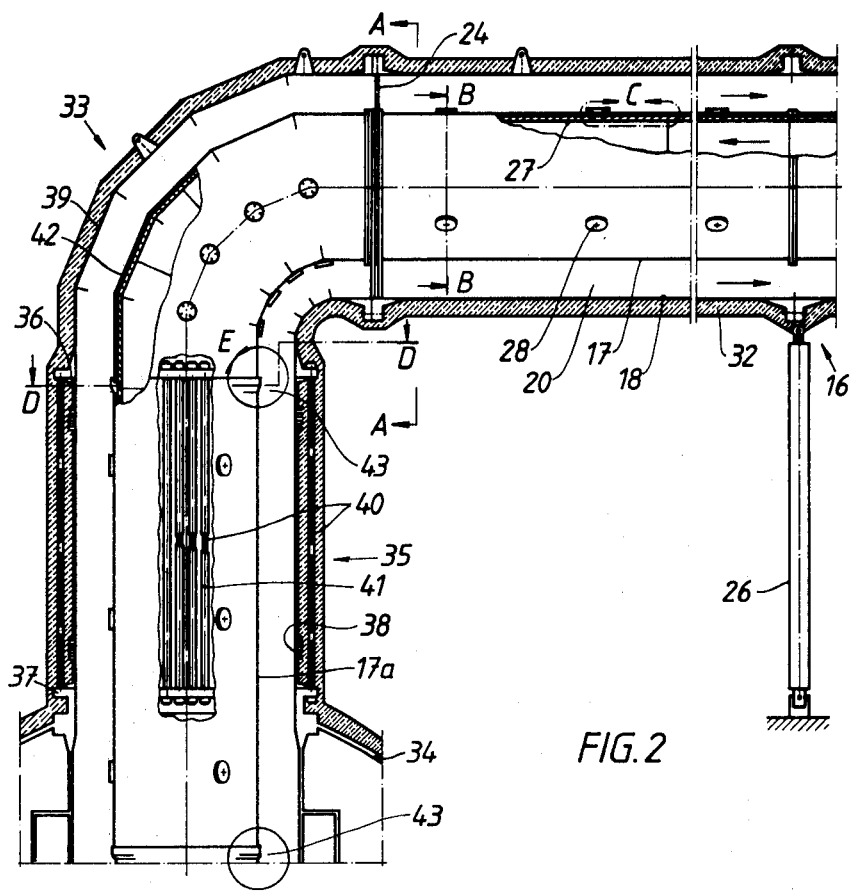
FIG. 2 shows an elevation view, in partial section, of a pipe connection between the combustion chamber and the turbine of the plant.
Figure 4:
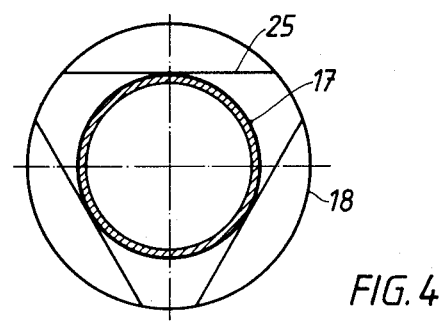
FIG. 4 shows a corresponding section in another embodiment.
Figure 7:
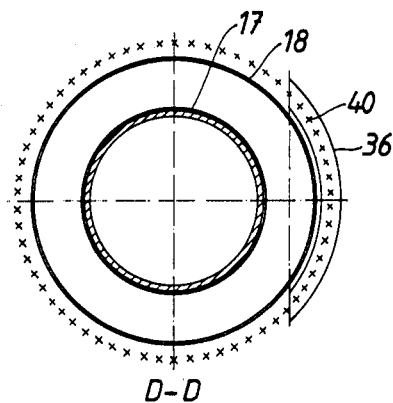
FIG. 7 shows a section of the conduit, taken along line D—D of FIG. 2.

Inner tube 17 of the conduit 16 may be centered in the tube 18 by means of a number of U-shaped holders 24 (FIGS. 2 and 3) or a number of radially extending plates 25 (FIG. 4) disposed parallel to the tube axis. Outer tube 18 is supported by a number of columns 26. In the inner tube 17 there are arranged a number of relatively short casing tubes 27 (FIGS. 5, 6 and 8), which are joined to the inner tube 17 by fixing elements 28 at three points. Casing tubes 27 are formed at their ends so as to be able to move axially with respect to one another when their length is changed because of temperature variations. The three-point attachment may cause the casing tubes 27 to become radially deformed, as shown in FIG. 5. The form of the tube in its cold and in hot conditions is indicated by 27a and 27b, respectively. Between the fixing elements 28 there may be supports 30. In the gap between tube 17 and casing tube 27 there is a layer of insulating material 31. Tube 18 is surrounded by an insulating layer 32.

Tubes 17 and 18 are fixed to the combustion chamber 1 so that axial relative movement is prevented. A tube bend 33 is joined to the turbine housing 34 by a coupling 35, which permits the tube bend 33 to be horizontally displaced when the horizontal portion of conduit 16 changes its length due to temperature variations. Between flange 36 on the outer tube 39 of tube bend 33 and the flange 37 on turbine housing 34, there is inserted an elongated bellows 38. The flanges are joined by a number of bolts 40, which take up forces arising due to the air pressure in conduit 16. Some bolts are surrounded by spacers 41 to determine the distance between flanges 36 and 37 and prevent overloading of bellows 38 at assembly.

Figure 8:
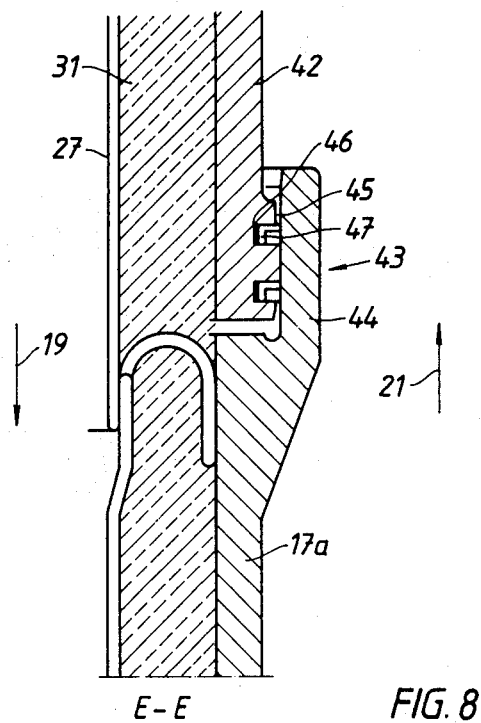
FIG. 8 shows a section through a flexible pipe connection, taken as shown at location E in FIG. 2.

Between the tube bend 42 of inner tube 17 and the vertical portion 17a of the inner tube 17 there is a coupling 43, shown in FIG. 8, which permits a certain angular deformation. The coupling 43 is constructed with a female sleeve 44 on the tube 17a and in the turbine housing 34, respectively, and with a spherical surface 45 on the male lower end of the tube bend 42 and the tube portion 17, respectively, said surface 45 projecting into the sleeve 44. Sealing piston rings 47 are applied in the slot 46.

Industrial Applicability

The claimed invention is particularly adapted for use in large gas turbine power plants, to provide an efficient transfer of hot gases to the turbine and combustion air to the combustion chamber. Those skilled in the art will realize, however, that the principles of the invention may be applied to turbine plants of various sizes in order to reduce the temperatures of key flow conduits, thereby minimizing their stress levels; and to minimize relative movement among the high pressure, high temperature flow conduits in the plant.

We claim:

1. A gas turbine plant, comprising:
   a combustion chamber having an inlet and an outlet;
   a gas turbine having an inlet spaced from said combustion chamber;
   a compressor having an outlet for supplying compressed combustion air to said combustion chamber;
   an inner conduit arranged between said outlet of said combustion chamber and said inlet of said turbine and provided with an internal thermal insulation;
   a casing tube arranged inside and spaced from said inner conduit, thus forming an annular gap between said casing tube and said inner conduit; and
   an outer conduit, coaxially arranged around said inner conduit between said outlet of said compressor and said inlet of said combustion chamber for conveying air through a gap defined between said inner and outer conduits.

2. A gas turbine plant according to claim 1, further comprising a layer of thermal insulation in said annular gap between said casing tube and said inner conduit.

3. A gas turbine plant according to claim 1, wherein said casing tube comprises a plurality of axial sections, each one of said plurality being connected to said inner conduit at least at three points around its circumference and, at least at one end, being adapted to move axially relative to the adjacent section.

4. A gas turbine plant according to claim 1, wherein said inner and outer conduits are fixed against axial movement relative to said combustion chamber.

5. A gas turbine plant according to claim 4, wherein said inner and outer conduits comprise a bent section, further comprising coupling means between said bent section and said turbine for permitting displacement of said bent section relative to said turbine.

6. A gas turbine plant according to claim 5, wherein said coupling means comprise a bellows.

7. A gas turbine plant according to claim 5, wherein said inner conduit comprises a plurality of axial sections, at least a portion of said sections comprising a sleeve adapted to receive the end of an adjacent section, said end comprising at least one seal ring for cooperation with said sleeve.

8. A gas turbine plant, comprising:
   a combustion chamber having an inlet and an outlet;

a gas turbine having an inlet spaced from said combustion chamber;

a compressor having an outlet for supplying compressed combustion air to said combustion chamber;

an inner conduit fixed against axial movement relative to said combustion chamber, arranged between said outlet of said combustion chamber and said inlet of said turbine and provided with internal thermal insulation, said inner conduit comprising a plurality of axial sections, at least a portion of said sections comprising a sleeve adapted to receive the end of an adjacent section, said end comprising at least one seal ring for cooperation with said sleeve;

an outer conduit fixed against axial movement relative to said combustion chamber and coaxially arranged around said inner conduit between said outlet of said compressor and said inlet of said combustion chamber for conveying air through a gap defined between said inner and outer conduits; and said inner and outer conduits having a bent section and coupling means between said bent section and said turbine for permitting displacement of said bent section relative to said turbine.

9. A gas turbine plant according to claim 8, further comprising a casing tube arranged inside and spaced from said inner conduit, thus forming an annular gap between said casing tube and said inner conduit, and a layer of thermal insulation in said annular gap.

10. A gas turbine plant according to claim 8, wherein said casing tube comprises a plurality of axial sections, each one of said plurality being connected to said inner conduit at least at three points around its circumference and, at least at one end, being adapted to move axially relative to the adjacent section.

11. A gas turbine plant according to claim 8, wherein said coupling means comprise a bellows.

* * * * *